Nov. 20, 1945.  L. R. BUCKENDALE  2,389,137
DRIVE AXLE
Filed Nov. 4, 1942  2 Sheets-Sheet 1
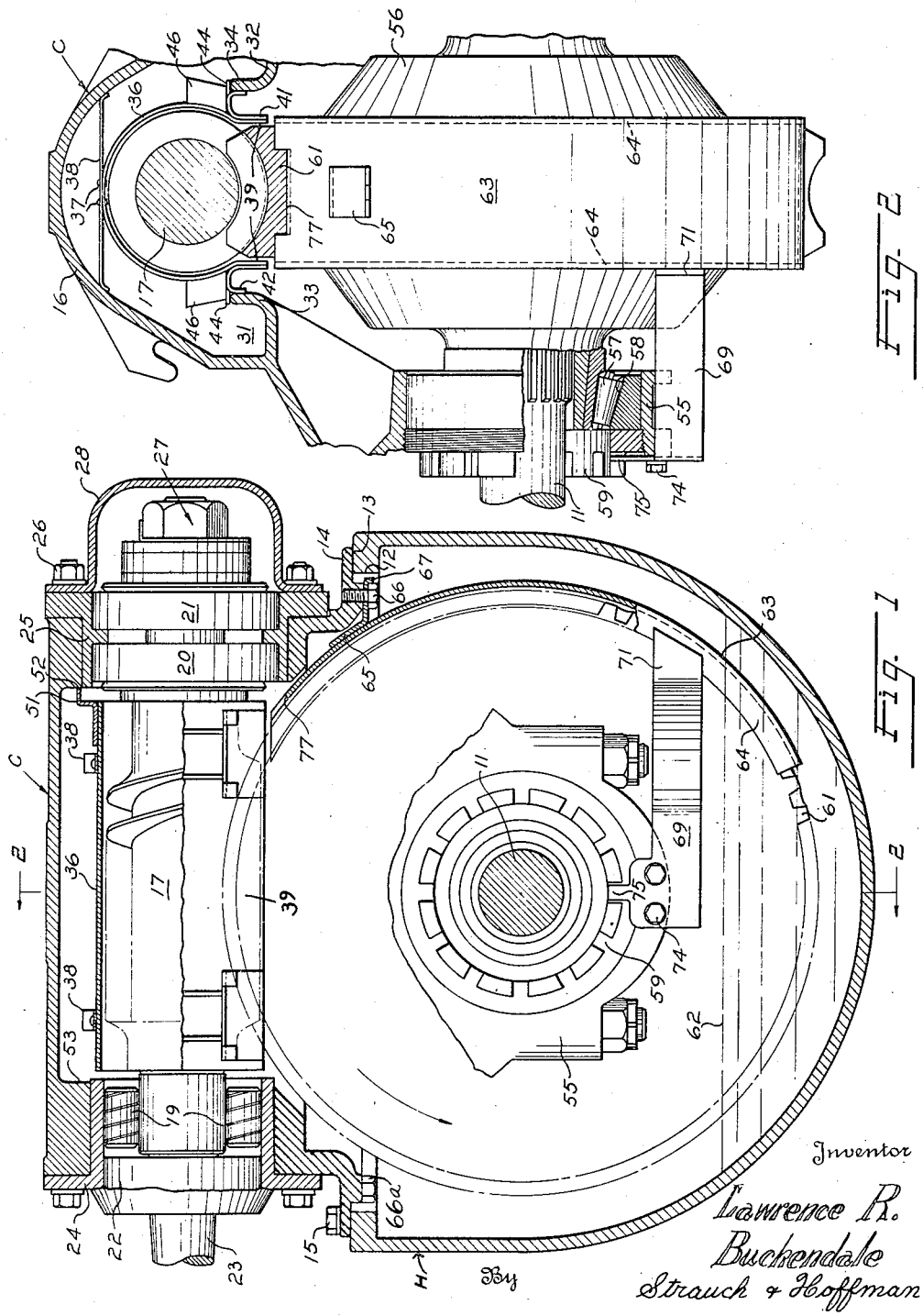
Inventor
Lawrence R. Buckendale
By Strauch & Hoffman
Attorneys Nov. 20, 1945. L. R. BUCKENDALE 2,389,137
DRIVE AXLE
Filed Nov. 4, 1942 2 Sheets-Sheet 2

Inventor
Lawrence R. Buckendale
By Strauch & Hoffman
Attorneys

Patented Nov. 20, 1945

2,389,137

UNITED STATES PATENT OFFICE 2,389,137

DRIVE AXLE

Lawrence R. Buckendale, Detroit, Mich., assignor to The Timken-Detroit Axle Company, Detroit, Mich., a corporation of Ohio Application November 4, 1942, Serial No. 464,489

14 Claims. (Cl. 184—11)

The present invention relates to drive axles, and more particularly to worm drive automotive drive axles, although it is not limited to such use.

In Morgan Patent No. 1,811,059, granted June 23, 1931, there is disclosed a worm drive axle embodying a one piece shroud device enclosing the upper portion of the worm and having a curved plate projecting downwardly into the housing in close proximity to the periphery of the worm gear and adapted to dip into the lubricant. The worm gear teeth are so designed as to provide pockets, so that during rotation the oil in each pocket is lifted to the worm, lubricating the meshing teeth, any excess lubricant being thrown against the worm shroud and falling back onto more advanced portions of the worm, or into the pockets of the worm gear.

The shroud device of the Morgan patent made it feasible for the existing worm drive axles to handle materially greater capacity loads, and to be used for heavier duty work than had theretofore been practicable, by insuring more thorough lubrication of the parts than had thereto been attainable.

It is the major object of this invention to improve the construction disclosed in the aforementioned Morgan patent, and, more specifically, to provide a novel shroud device which may be effectively employed with worm gears of various types, eliminating the necessity for a special form of worm gear, or for a worm shroud fitting closely around the worm and curved at its sides to fit the worm gear, such as shown in the Morgan patent, and to also provide a device which may be more readily applied to and removed from the axle, and yet which when in place is rigidly supported and efficiently controls lubricant flow.

A further important object is to provide a lubricant controlling shroud of resilient material which may be deformed and inserted into the chamber of an axle carrier and sprung into place and resiliently locked against removal, obviating the need for separate fastening means.

Another object is to provide a carrier type axle assembly with a lubricant controlling device embodying separate shrouds for the driving and driven gears, which are both supported by the carrier so that they may be assembled in final adjusted position with respect to the gears and the carrier, and then assembled on the axle housing, the shrouds and their anchorages being so designed that they do not interfere with adjustment of the gears and bearings of the axle.

Further objects will become apparent as the specification proceeds in conjunction with the annexed drawings and from the appended claims.

In the drawings:

Figure 1 is a vertical transverse sectional view through a drive axle embodying the invention, parts being broken away and omitted to simplify the disclosure;

Figure 2 is a fragmentary sectional view taken substantially on the line 2—2 of Figure 1;

Figure 3:
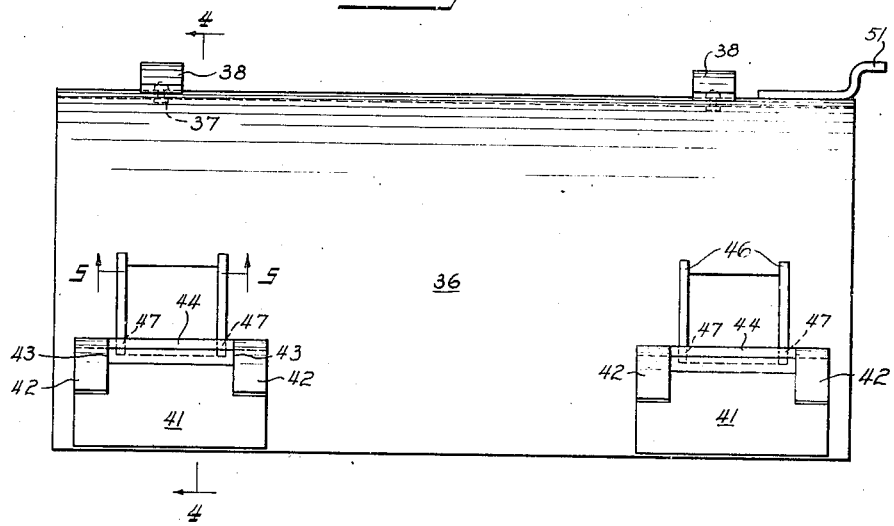
Figure 3 is a side elevational view of the worm shroud shown in Figure 1, as it appears when removed from the axle and in unstressed condition.

With continued reference to the drawings, in which like reference characters have been employed to designate similar parts throughout the several views thereof, the invention has been illustrated as applied to a top mounted carrier type worm drive axle of the general character shown in the aforementioned Morgan patent, and in Figure 2 of Alden Patent No. 1,999,071.

The axle is made up of a carrier C and a main housing section designated at H, provided with oppositely extending axle arms each containing an axle shaft 11. The housing section H has a large top opening 12, and a bolting face 13 adjacent the opening.

The gearing and the novel shroud assemblies of the invention are mounted on a carrier C, which forms a complemental housing section, having a flange 14 secured to housing bolting face 13 by cap screws 15. The carrier is provided with a curved upper portion 16 in which a worm 17 is journalled for rotation in anti-friction bearings 19, 20 and 21. Bearing 19, together with a seal assembly 22 for front portion 23 of the worm, is secured in place in the carrier by means of a bolted sleeve 24.

Bearings 20 and 21 serve to take the thrust set up by operation of the worm and are carried in a flanged sleeve 25 secured in an opening in the carrier by means of studs and nuts 26, the inner races of the bearings being secured to the worm shaft by a nut and lock washer assembly 27. A closure 28 is also secured under nuts 26, to exclude dirt from, and to retain lubricant in, the carrier in well-known manner.

Carrier C is provided with a pair of lubricant receiving troughs 31 and 32, terminating in lips 33 and 34, respectively, which extend substantially parallel to the axis of worm 17, spaced from the sides thereof, as seen in Figure 2. The oil received in troughs 31 and 32 during operation of the gearing may be conveyed through ducts to the differential casing bearings in well known manner.

I have found that by providing a thin resilient metallic shell of substantially inverted U-shape in cross-section, and closely fitting over the top and sides of the worm, the lubricant picked up by the ring gear and thrown into the shell provides efficient lubrication of the worm throughout its length, and also, by providing supporting and positioning fingers on the lower edge of the shell, it may be resiliently deformed and sprung into place between supports 33 and 34 and firmly and accurately located in operative relationship to the worm, and, by providing resilient means urging the shell down onto the supports, there is no possibility of the shroud becoming dislodged during operation.

The shroud is preferably made of fairly resilient sheet metal, and comprises a body 36, so formed as to have a slightly greater diameter than the worm when disposed in the assembled position shown in Figure 2. Secured to the upper part of the shroud, as by means of rivets 37 or the like, are a pair of leaf springs 38 which, when the parts are in the position shown in Figure 2, engage the inner side of carrier portion 16 with sufficient force to urge the shroud firmly down on its seat, now to be described.

The lower edges of the shroud are provided with vertical portions 39 to which are secured, as by welding or the like, preferably four sheet metal brackets or plates 41, which are so formed as to constitute both supporting and spacing assemblies for the shroud, as will now be described.

Each plate is provided with a pair of outwardly and downwardly extending legs 42, which are engaged with side supports 33 and 34, as seen in Figure 2, and restrain the shell against lateral movement. Fingers 42 are preferably formed by slitting the blank along the line 43, and bending the fingers 42 downwardly and allowing the middle portion to project outwardly and form supports 44, which seat upon lips 33 and 34. Fingers 44 are preferably reinforced against flexing upwardly in response to the weight of the shell and the pressure of spring 38, by wings 46, which are preferably struck out of the material of the shroud and engage fingers 44 at 47, as seen in Figures 3 and 4.

It is accordingly apparent that fingers 42 prevent the shroud from shifting transversely with respect to the worm; fingers 44 adequately support the shroud at four spaced regions upon supporting lips 33 and 34, and that wings 46 back up fingers 44 and prevent them from flexing out of position. Also, the opening 48 provided by striking wings 46 out of the shell provides four discharge ports through which part of the lubricant thrown by the worm may discharge over lips 33 and 34 into troughs 31 and 32, and then may be conducted to various other parts of the device in well known manner.

Figure 4:
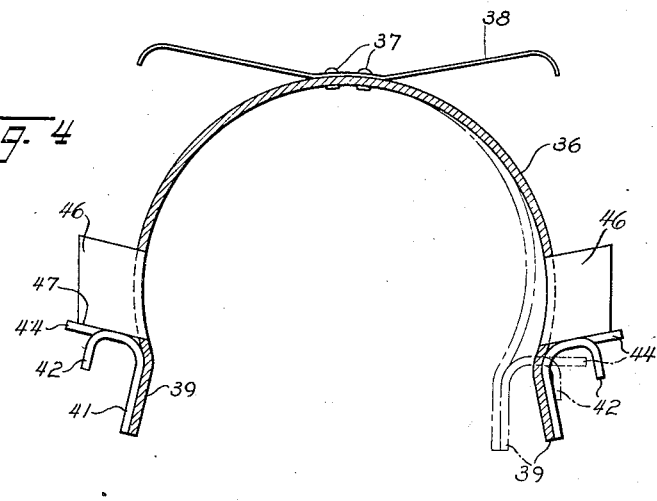
Figure 4 is a vertical sectional view taken on the line 4—4 of Figure 3.
Figure 5:
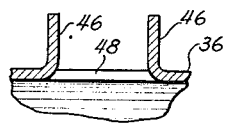
Figure 5 is a fragmentary sectional view taken on the line 5—5 of Figure 3.

Before it is installed in the housing, the worm shroud assumes the full line position shown in Figures 3 and 4, with the result that when it is flexed inwardly slightly beyond the dotted line position of Figure 4, so as to bring fingers 44 past supports 33 and 34, and is pushed up into the carrier against the action of springs 38, sufficiently for fingers 44 to clear the supporting lips, and then released, it will resiliently spring outwardly and bring its spacing fingers 42 into tight engagement with lips 33 and 34. Also, the act of pushing the shroud into the carrier places the springs 38 under considerable stress, with the result that they urge the shroud downwardly and build up sufficient pressure between fingers 44 and the supporting lips to insure firm seating of the shroud upon its supports at all times.

Proper longitudinal positioning of the shroud in the carrier is insured by a bracket 51 welded onto the one end of the shell and coacting with an abutment 52 on the carrier. Movement of the shroud to the left in Figure 1 is limited by a shoulder 53 in the carrier and the right-hand end of sleeve 24, which is adapted to directly contact the left-hand end of the shroud.

In this way the worm shroud is accurately located both longitudinally of the worm and also accurately disposed with respect to the periphery of the worm.

The carrier is also provided with a pair of spaced supports 55, in which a differential casing 56 is mounted for rotation in anti-friction bearings 57 having outer races 58. An adjusting ring 59, threaded into each support 55, abuts outer race 58, and is adapted to take up the clearance in bearings 57 in well known manner. The left-hand ring 59 in Figure 2 is locked in adjusted position in a novel manner to be hereinafter pointed out, while the right-hand ring is locked in well known manner.

Rigidly carried by casing 56 is a worm gear 61, mashing with worm 17, power being transmitted from worm 17 to gear 56, and through a differential mechanism in casing 56, to the axle shaft 11 in well known manner.

Housing H is adapted to contain lubricant at a level indicated by the line 62, and extending upwardly from a point below the lubricant level is a novel worm gear shroud 63, having inwardly directed flanges 64 at each side adapted to substantially close the ends of the teeth of the worm gear and define a trough, so that upon rotation of the ring gear in the direction indicated by the arrow in Figure 1, the lubricant trapped in the spaces between the teeth will be "pocketed" and carried upwardly and be thrown against the worm and worm shroud 36.

Shroud 63 is supported in cooperative relationship with the worm gear by means of a bracket 65, welded to the upper, outer surface of the guard, and secured to the under face of the carrier by a cap screw 66, the end of the bracket being bent up against one of the flats of screw 66, as indicated at 67, to lock the screw in place.

The carrier is symmetrical, to permit application of the carrier to either direction of rotation, a cap screw 66a being threaded into the opposite opening, so that by removing the screw the worm gear shroud may be installed on the opposite side of the gear.

The lower end of the guard is anchored in place, in operative relationship to the worm gear, by means of a bracket 69, which has a flanged end 71 welded to one of the side flanges of the shroud. The other end of bracket 69 is secured to support 55 by means of cap screws 74. Bracket 69 also has a locking lug 75 adapted to be inserted between two of the lugs of locking ring 59 and lock it against rotation.

During operation of the axle the teeth below the lubricant level in the main housing cooperate with shroud 63 to define closed pockets and since flanges 64 in effect close the ends of the spaces between the teeth, a body of oil is lifted upwardly inside of shroud 63 and thrown into the zone of meshing engagement of the worm gear with the worm, a part of the oil being thrown up inside of the worm shroud 36. Lubricant is accordingly carried directly to the worm, insuring adequate lubrication thereof. Any excess oil will be thrown from the worm against the casing, where it spatters and part of it drips back onto the more advanced portion of the worm, it being observed in Figure 2 that the lower edges of the worm shroud terminate close to but spaced outwardly from the side faces of the worm gear so that it is unnecessary to cut out the worm shroud to closely fit it with respect to the worm gear. As seen in Figure 2, vertical lower portions 39 of the shroud 36 are disposed in close proximity to the cheeks of worm gear 61, so that lubricant gravitating thereto will be centrifugally thrown back into the shell 36.

As seen in Figure 2, an opening 77 is provided in the upper end of the shroud 63 to insure that the worm and its associated parts will clear the shroud, especially when the worm and bearing assembly are being slid endwise into place in the carrier.

When it is desired to disassemble the mechanism it is merely necessary to remove the axle shafts, unbolt the carrier from the housing and lift the carrier out of the housing, it being observed that opening 12 in the housing is sufficiently large to permit gear 61 and its associated shroud to pass therethrough.

From the foregoing detailed disclosure of the invention, it is apparent that I have provided a worm drive axle embodying separate and independently mounted shroud devices for the worm and the worm gear, which are rigidly secured in novel cooperating relationship with the worm and worm gear and cooperate with each other in novel manner to properly convey lubricant from the housing to the worm, the shrouds embodying novel means mounting them both rigidly upon the carrier structure in such manner that they may be removed as a unit with the carrier, and they are so designed as to avoid interference with adjustment of the gears or bearings of the axle, and yet the shrouds may be readily removed when desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a worm drive axle, a housing adapted to contain a body of lubricant; a carrier secured to said housing and including bearing supports disposed within said housing; a differential mechanism mounted for rotation in said bearings carried by said bearing supports and having a worm gear adapted to dip into said lubricant; a worm journalled in said carrier and meshing with said worm gear, said carrier having a pair of web-like members disposed in spaced relationship to the sides of said worm; and means including a worm shroud device supported on said members in operative relationship to said worm operable to direct lubricant centrifugally thrown by said worm gear to said worm.

2. The axle construction defined in claim 1, in which said shroud device comprises a cylindrical shell having supporting portions seating upon the upper edges of said members and bearing portions resiliently urged against the neighboring sides of said members.

3. The axle construction defined in claim 1, wherein said shroud device is provided with resilient means for forcing it down into tight engagement with said members.

4. The axle construction define in claim 1, wherein said shroud device is provided with a plurality of ports operable to discharge lubricant over said members.

5. In a worm gear drive a housing; a carrier mounted on said housing a worm rotatably mounted within said carrier; spaced rigid abutments in said carrier at opposite sides of said worm; a resilient shell extending in spaced relation along and partly about said worm, said shell being deformable by reason of its resiliency to permit introduction into said carrier and being positioned between said abutments, the latter preventing its return to undeformed condition, whereby said shell is resiliently and frictionally locked within said carrier.

6. The worm gear drive defined in claim 5, wherein external projections are provided on said shell for engaging said abutments and limiting movement of said shell toward said worm.

7. The worm gear drive defined in claim 5, wherein a stop projection provided on one end of said shell engages a fixed part of the carrier to limit longitudinal movement of said shell during its introduction into the carrier and locate it properly along the axis of said worm.

8. A worm shroud comprising a substantially semi-cylindrical shell of generally U-shaped form in transverse section made of thin springy metal and having integral support projections formed by material bent out from the walls of said shell adjacent the free edges thereof, said projections being disposed substantially at right angles to the legs of the U.

9. A gear shroud comprising a substantially cylindrical shell terminating in spaced, axially extending edges, and having bearing and supporting means on each of said edges; and at least one spring located exteriorly of said shell and adapted to force the shroud into assembled position, with said bearing and supporting means engaging a support.

10. In a drive axle, a hollow carrier having a closed side and an open side; a drive gear journalled in said carrier; a pair of supports in said carrier facing towards the closed side thereof; a thin resilient shroud for said gear having seating portions adapted to be engaged behind the portions of said supports which face toward the closed side of said carrier; and means for urging said shroud outwardly toward the open side of said carrier, for holding said seating portions against said supports.

11. The axle construction defined in claim 10, wherein said supports are also provided with surfaces facing each other, and said shroud is operable to resiliently urge said seating portions outwardly into engagement with said surfaces.

12. For use in a drive axle; a worm shroud comprising a thin resilient shell of substantially U-shape in transverse section, each leg of said shroud having a supporting bracket secured thereto adjacent its edge, and the metal adjacent each bracket being formed to provide at least one tab backing up and reinforcing each bracket.

13. In a worm gear drive, a carrier, a worm rotatably mounted within said carrier; a lubricant controlling shroud partially surrounding said worm and held within said carrier by resilient means exerting forces against said carrier in directions normal to the axis of said worm.

14. In a worm gear drive axle, a carrier; a worm rotatably mounted within said carrier; a plurality of bearing surfaces on said carrier disposed in predetermined relationship to said worm; and a resilient shell extending in spaced relation along and partly about said worm and seating against said bearing surfaces, and being spaced from the walls of said carrier; said shell being deformed for introduction into said carrier and being locked within said carrier by reason of its inherent tendency to return to its undeformed condition which serves to maintain it in tightly seating engagement with said bearing surfaces.

LAWRENCE R. BUCKENDALE.